US007060787B2

(12) United States Patent
Gupta et al.

(10) Patent No.: US 7,060,787 B2
(45) Date of Patent: Jun. 13, 2006

(54) EXTRACTION OF IMPURITIES FROM GRAFTED POLYOLEFINS

(75) Inventors: Vijai P. Gupta, Berwyn, PA (US); Edward P. Carey, Atglen, PA (US)

(73) Assignee: Lyondell Chemical Technology, L.P., Houston, TX (US)

( * ) Notice: Subject to any disclaimer, the term of this patent is extended or adjusted under 35 U.S.C. 154(b) by 0 days.

(21) Appl. No.: 10/846,735

(22) Filed: May 14, 2004

(65) Prior Publication Data

US 2005/0256297 A1 Nov. 17, 2005

(51) Int. Cl.
*C08F 6/00* (2006.01)

(52) U.S. Cl. .......................... 528/480; 203/92; 203/93; 203/94; 203/95; 508/221; 508/231; 524/502; 524/505

(58) Field of Classification Search .................. 203/92, 203/93, 94, 95; 508/221, 331; 524/502, 524/505; 525/70, 88, 90; 528/480
See application file for complete search history.

(56) References Cited

U.S. PATENT DOCUMENTS

| | | | | |
|---|---|---|---|---|
| 3,862,265 | A | 1/1975 | Steinkamp et al. | 260/878 R |
| 3,941,843 | A * | 3/1976 | Kletecka et al. | 564/429 |
| 3,953,655 | A | 4/1976 | Steinkamp et al. | 428/474 |
| 4,001,172 | A | 1/1977 | Steinkamp et al. | 260/42.18 |
| 4,031,039 | A * | 6/1977 | Mizumoto et al. | 521/46.5 |
| 4,360,629 | A * | 11/1982 | Wootton et al. | 524/553 |
| 4,537,836 | A | 8/1985 | Adur et al. | 428/522 |
| 4,698,395 | A | 10/1987 | Inoue et al. | 525/327.8 |
| 4,774,144 | A | 9/1988 | Jachec et al. | 428/461 |
| 4,842,947 | A | 6/1989 | Jachec et al. | 428/461 |
| 5,128,410 | A | 7/1992 | Ilendra et al. | 525/71 |
| 5,140,074 | A | 8/1992 | DeNicola, Jr. et al. | 525/263 |
| 5,229,456 | A | 7/1993 | Ilenda et al. | 525/66 |
| 5,336,721 | A | 8/1994 | Kiang | 525/78 |
| 5,344,888 | A | 9/1994 | Wild et al. | 525/301 |
| 5,367,022 | A | 11/1994 | Kiang et al. | 525/74 |
| 5,411,994 | A | 5/1995 | Galli et al. | 521/50.5 |
| 5,439,974 | A | 8/1995 | Mattson | 525/74 |
| 5,871,554 | A * | 2/1999 | Patil et al. | 44/331 |
| 2003/0029712 | A1* | 2/2003 | Cockrem et al. | 203/2 |
| 2004/0249207 | A1* | 12/2004 | Lin et al. | 562/600 |

FOREIGN PATENT DOCUMENTS

| | | |
|---|---|---|
| JP | 2185505 | 7/1990 |
| JP | 4202202 | 7/1992 |

OTHER PUBLICATIONS

*Hawley's Condensed Chemical Dictionary*, 11th ed. (1987) p. 109.

Curzons, et al., *Clean Products and Processes 1* (1999) 82.

Robert C. Weast, Ph.D., Editor, *CRC Handbook of Chemistry and Physics 49th edition* (1968) D-1.

John H. Perry, Ph.D., Editor, *Chemical Engineers' Handbook 3rd edition* (1950) 635.

* cited by examiner

*Primary Examiner*—Terressa Boykin
(74) *Attorney, Agent, or Firm*—John Tyrell; Jonathan L. Schuchardt

(57) ABSTRACT

A process for purifying grafted polyolefins by extraction is disclosed. The purified grafted polyolefins have improved color and adhesion properties. The extraction is performed with an azeotropic solvent that is strong enough to extract impurities but does not cause sticking of the grafted polyolefin. The azeotropic solvent can be easily recycled.

20 Claims, No Drawings

EXTRACTION OF IMPURITIES FROM GRAFTED POLYOLEFINS

FIELD OF THE INVENTION

The invention relates to a process for purifying a grafted polyolefin. The purification is done by extraction with an azeotropic solvent. The process gives purified grafted polyolefins with improved color.

BACKGROUND OF THE INVENTION

Grafted polyolefins are well known and can be prepared by a variety of methods. Commonly, the polyolefin is treated with peroxides and then brought into contact with suitable monomers. As a result of the treatment with the peroxides, which act as initiators, free radicals are first formed at the polymer chain, with which monomers can undergo an addition reaction in a grafting reaction. Heat, radiation, and other techniques can also be used to graft monomers to polyolefins. The grafting can be done in a variety of ways. One method, illustrated in U.S. Pat. Nos. 3,862,265, 3,953,655 and 4,001,172, grafts monomers such as maleic anhydride to polypropylene in an extruder. U.S. Pat. No. 4,537,836 grafts monomers to polyethylene in a Brabender mixing unit. U.S. Pat. Nos. 5,344,888 and 5,367,022 melt graft monomers to polyolefins such as propylene and ethylene-propylene copolymers. U.S. Pat. No. 5,140,074 heats the polyolefin in a reactor under nitrogen and introduces a free-radical initiator and a vinyl monomer. U.S. Pat. No. 5,411,994 irradiates a high-porosity particulate polyolefin and thereafter adds a liquid vinyl monomer. U.S. Pat. Nos. 5,128,410 and 5,229,456 prepare graft copolymers by dissolving or swelling a polyolefin in an inert solvent, heating and stirring the mixture while adding a grafting monomer and a radical initiator, followed by volatilizing the solvent, for example in a devolatilizing extruder.

Grafted polyolefins are especially useful as blend components and can impart adhesion to the blend. For example, U.S. Pat. Nos. 4,774,144, 4,842,947, 5,336,721, and 5,439,974 describe several blends employing graft polyolefins.

Despite the many methods for the preparation of grafted polyolefins, all methods can suffer by having some unreacted grafting monomer or other low molecular weight species as impurities in the grafted polyolefin. These impurities can have a deleterious effect on certain properties such as color, adhesion, or film clarity.

U.S. Pat. No. 4,698,395 purifies the grafted polyolefin by dissolving the grafted polyolefin in an organic solvent and then precipitating particles with aqueous base. This process can be difficult if starting with solid grafted polyolefin. For instance, in Example 3, they purify 100 parts of grafted polyolefin with 2,000 parts of xylene and 2,000 parts of aqueous sodium hydroxide. Such large volumes are costly and the process requires dissolving the grafted polyolefin.

Japanese Pat. No. 2185505 immerses molten grafted polyolefin in a carbonyl containing solvent such as methyl ethyl ketone to remove impurities. This process requires melting the grafted polyolefin and it can be difficult to isolate the purified product.

Japanese Pat. No. 4202202 purifies grafted polyolefin by refluxing with a mixture of toluene and methyl ethyl ketone, followed by rinsing with acetone. Toluene and methyl ethyl ketone do not form an azeotrope. This process uses three solvents and recovery of solvents is difficult, thereby adding to the cost and complexity of the process.

There remains a need for a simple, efficient, and low cost process to remove impurities from grafted polyolefins. The impurities can have a deleterious effect on certain properties such as color, adhesion, or film clarity.

SUMMARY OF THE INVENTION

The invention is a process for purifying grafted polyolefins. The process comprises extracting a grafted polyolefin with an azeotropic solvent and drying the purified grafted polyolefin. The purified grafted polyolefin has improved color, adhesion, and film clarity. The azeotropic solvent used in the extraction can be distilled to recover a purified azeotropic solvent. The process is useful for purifying maleic anhydride-grafted polypropylene.

DETAILED DESCRIPTION OF THE INVENTION

In the process of the invention, an azeotropic solvent is used to purify a grafted polyolefin.

The polyolefin is based predominantly upon monomers of ethylene, $C_3$–$C_{20}$ $\alpha$-olefins such as propylene, 1-butene, 1-hexene, 1-octene, and the like. Mixtures of olefins can be used. Suitable polyolefins include polyethylene, polypropylene, copolymers of ethylene with 1-butene, and terpolymers of ethylene, propylene, and a diene such as ethylidene norbornene. Polypropylene and propylene copolymers such as ethylene-propylene and ethylene-propylene-diene are preferred.

The polyolefin is grafted, preferably with an alkene-containing grafting agent. Suitable alkene-containing grafting agents include vinyl silanes, dienes, and alkene-containing carboxylic acids and carboxylic acid derivatives such as anhydrides, esters, and amides. Suitable alkene-containing carboxylic acids include acrylic acid, methacrylic acid, maleic acid, and the like. Suitable alkene-containing carboxylic acid derivatives include maleic anhydride, itaconic anhydride, ethyl acrylate, vinyl acetate, and acrylamide. Preferably, the grafting agent is maleic anhydride.

The grafted polyolefin is extracted with an azeotropic solvent, which is more precisely a mixture of solvents. The use of a solvent mixture allows the solvation power of the extraction solvent to be varied. If the solvent is too weak, such as a hydrocarbon, the extraction will be inefficient and many of the impurities will not be removed. If the solvent is too strong, such as an aliphatic ester, the impurities will be readily extracted, but the grafted polyolefin can become sticky and self-adherent. A mixture of solvents is needed to strike a balance. When the solvent mixture is an azeotrope, it can be readily recovered and recycled without significantly changing its composition.

An azeotrope is a liquid mixture of two or more substances. It behaves like a single substance in that the vapor produced by partial evaporation of liquid has the same composition as the liquid (see *Hawley's Condensed Chemical Dictionary,* 11th ed. (1987)). Preferably, the azeotropic solvent is a mixture of two solvents, i.e., a binary azeotrope. Binary azeotropes can be found in many chemistry or chemical engineering handbooks. Preferably, the azeotrope is a minimum-boiling azeotrope where the boiling point of the mixture is lower than the boiling point of either component. Examples of azeotropes can be found in *Clean Products and Processes* 1 (1999) 82 and in many reference books such as *CRC Handbook of Chemistry and Physics* 49$^{th}$ *edition* (1968) D-1 and Perry's *Chemical Engineers' Handbook* 3$^{rd}$ *edition* (1950) 635.

Preferably, the azeotrope has a boiling point from about 35° C. to about 100° C., more preferably from about 50° C. to about 80° C.

Preferably, the azeotropic solvent is a mixture of a $C_5$–$C_8$ hydrocarbon with a $C_1$–$C_{10}$ oxygen-containing compound. Suitable $C_5$–$C_8$ hydrocarbons include hexane, heptane, 2,5-dimethylhexane, cyclohexane, and toluene. Preferably, the $C_1$–$C_{10}$ oxygen-containing compound is an aliphatic alcohol such as methanol, ethanol, or isopropyl alcohol, an aliphatic ketone such as acetone or methyl ethyl ketone, or an aliphatic ester such as methyl acetate, ethyl acetate, propyl acetate, isopropyl acetate, ethyl propionate, or propyl formate. More preferably, the $C_1$–$C_{10}$ oxygen-containing compound is an alkyl acetate such as methyl acetate, ethyl acetate, propyl acetate, or isopropyl acetate.

Not all combinations of $C_5$–$C_8$ hydrocarbons and $C_1$–$C_{10}$ oxygen-containing compounds form azeotropes. Examples of combinations that do form azeotropes are cyclohexane/acetone, cyclohexane/1-butanol, cyclohexane/t-butanol, cyclohexane/methyl ethyl ketone, cyclohexane/ethyl acetate, hexane/ethyl acetate, hexane/t-butanol, toluene/isopropanol, toluene/methanol, heptane/methyl ethyl ketone, heptane/ethyl propionate, and heptane/isopropyl acetate.

Preferred azeotropic solvents are hexane/ethyl acetate, heptane/methyl ethyl ketone, heptane/ethyl propionate, heptane/isopropyl acetate, and cyclohexane/ethyl acetate. More preferred is hexane/ethyl acetate.

The extraction is preferably done without mechanical agitation. Mechanical agitation can mash the pellets of the grafted polyolefin. One preferred technique for extraction is to place pellets of grafted polyolefin in a column and boil the azeotropic solvent through the column. In this preferred method, the liquid-vapor mixture percolates from the bottom of the column through the pellets and is then condensed after it exits the top of the column. Preferably, the pellets are immersed in the boiling azeotropic solvent. Boiling agitates the pellets. Preferably, this is done continuously with the condensate being recycled and pumped to the bottom of the column. Preferably, an inert gas such as nitrogen is also fed from the bottom of the column. The inert gas also agitates the pellets and improves the extraction process. The inert gas also provides a safety measure since the azeotropic solvent is often flammable.

The amount of azeotropic solvent used in the extraction is preferably from more than 3 to about 10 parts by weight per grafted polyolefin. If the amount of azeotropic solvent is too low, it is difficult to have enough solvent to circulate and recycle and the extraction can be ineffective. If the amount of solvent is high, the extraction is effective, but costs increase due to increased solvent usage and larger-equipment requirements. A ratio of 4 parts by weight azeotropic solvent to grafted polyolefin is convenient and gives good results.

Preferably, the extraction is done for 3 to 12 hours. If the extraction time is too short, the extraction can be ineffective. If the extraction time is longer than 12 hours, the extraction is effective, but there is no added benefit. An extraction time of 6 hours is convenient and gives good results.

Preferably, after the extraction, the grafted polyolefin is washed with the azeotropic solvent to remove any impurities on the surface of the pellets or dissolved in the solvent that is wetting the pellets. One convenient method is to drain the column after the extraction and then circulate ambient-temperature azeotropic solvent through the column while feeding nitrogen from the bottom of the column. Preferably, the wash time is from about 5 minutes to about 3 hours. If the wash time is too short, it can be ineffective and longer times are unnecessary. A wash time of 30 minutes is convenient and gives good results. After the washing, the solvent is drained from the purified grafted polyolefin.

After the extraction (and after the wash, when the wash is done), the solvent is drained off and the purified grafted polyolefin is dried to remove residual solvent. Preferably, the polyolefin is dried to lower residual solvent below 0.5% by weight, more preferably, below 0.1% by weight. The drying can be done by any of several methods. One preferred method is to pass an inert gas through the polyolefin to sweep the solvent from the polyolefin. Preferably, the inert gas is heated.

Preferably, the azeotropic solvent is recovered by distillation for subsequent use. Because it is an azeotropic mixture, this is readily done and the distillate has the same composition. Non-azeotropic mixtures would be difficult to purify by distillation and different fractions of the distillation would have different compositions. A distillation of a non-azeotropic mixture would enrich the composition in the lower boiling component.

Used azeotropic solvent is preferably distilled to recover most of the solvent, leaving behind a pot residue rich in extracted impurities that is usually discarded. The distillate can be used in subsequent extractions.

The process provides a convenient way to extract impurities from grafted polyolefin. The purified grafted polyolefin has improved adhesion and improved color. The azeotropic solvent used in the extraction can be easily recycled for reuse in the process.

The following examples merely illustrate the invention. Those skilled in the art will recognize many variations that are within the spirit of the invention and the scope of the claims.

EXAMPLE 1

Pelletized maleic anhydride-grafted polypropylene resin (200 g) is charged to a column. The resin is extracted with 800 grams of a boiling azeotropic solvent (62% by weight hexane and 38% by weight ethyl acetate) by boiling the solvent through the column, cooling the vapors that exit the top of the column, and pumping the condensed solvent back to the bottom of the column. Throughout the extraction, the resin is immersed in the boiling solvent. Agitation is provided by the boiling solvent, by the recycling of condensate, and by a stream of nitrogen fed to the bottom of the column. The extraction is performed for six hours, and the solvent is then drained from the pellets. Fresh solvent (800 grams of a mixture containing 62% by weight hexane and 38% by weight ethyl acetate) is circulated through the pellets at ambient temperature for thirty minutes to wash the pellets. The wash solvent is drained. The resin is dried with hot nitrogen and is then cooled to ambient temperature. The resin is free-flowing and non-sticky. The grafted polypropylene has good color and adhesion performance.

COMPARATIVE EXAMPLE 2

All conditions are kept the same as Example 1 with the exception of using 100% ethyl acetate as the solvent. After the cooling step, the resin is sticky and requires mechanical force to break it up.

COMPARATIVE EXAMPLE 3

All conditions are kept the same as Example 1 with the exception of using 600 grams of 100% hexane as the solvent and performing the extraction for one hour. After the cooling step, the resin color is unchanged and remains yellow. The hexane remains clear indicating that colored impurities are not being removed.

Comparative Examples 2 and 3 demonstrate that a single solvent does not give the required balance of properties. Strong solvents alone, like ethyl acetate, give a sticky product; weak ones alone, like hexane, inadequately extract the impurities.

EXAMPLE 4

The procedure of Example 1 is generally followed except that solvent-to-resin ratios of 1:1, 2:1, and 3:1 are used. The grafted polypropylene is somewhat inferior to that of Example 1 with regard to color and adhesion properties.

This demonstrates the advantage of using from more than 3 to about 10 parts solvent by weight per grafted polyolefin.

EXAMPLE 5

The procedure of Example 1 is generally followed except that the extraction is done for 2 hours. After the cooling step, the grafted polypropylene has a pale yellow color compared to white product produced in Example 1.

This demonstrates the advantage of performing the extraction for 3 to 12 hours. When the extraction time is too short, the grafted polypropylene has somewhat inferior properties.

The preceding examples are meant only as illustrations. The following claims define the invention.

We claim:

1. A process which comprises extracting a mixture comprising a grafted polyolefin and low molecular weight impurities with an azeotropic solvent and drying the purified grafted polyolefin, wherein the azeotropic solvent is a liquid mixture of two or more substances that behaves like a single substance in that vapor produced by partial evaporation of the liquid mixture has the same composition as that of the liquid mixture.

2. The process of claim 1 wherein the used azeotropic solvent is distilled to recover a purified azeotropic solvent.

3. The process of claim 1 wherein the grafted polyolefin is a grafted polypropylene or a grafted propylene copolymer.

4. The process of claim 1 wherein the grafted polyolefin is made by grafting a polyolefin with an alkene-containing grafting agent selected from the group consisting of vinyl silanes, dienes, and alkene-containing carboxylic acids and carboxylic acid derivatives.

5. The process of claim 4 wherein the alkene-containing grafting agent is maleic anhydride.

6. The process of claim 1 wherein the grafted polyolefin is polypropylene grafted with maleic anhydride.

7. The process of claim 1 wherein the azeotropic solvent is a binary azeotrope.

8. The process of claim 7 wherein the solvent is a mixture of a $C_5$–$C_8$ hydrocarbon with a $C_1$–$C_{10}$ oxygen-containing compound.

9. The process of claim 8 wherein the $C_1$–$C_{10}$ oxygen-containing compound is an aliphatic alcohol, an aliphatic ketone, or an aliphatic ester.

10. The process of claim 9 wherein the oxygen-containing compound is an alkyl acetate.

11. The process of claim 10 wherein the hydrocarbon is hexane and the alkyl acetate is ethyl acetate.

12. The process of claim 1 wherein the grafted polyolefin is extracted with the azeotropic solvent for a period of 3 to 12 hours.

13. The process of claim 1 wherein the azeotropic solvent is boiled through a column containing the grafted polyolefin and low molecular weight impurities.

14. The process of claim 1 wherein the azeotropic solvent has a boiling point from about 35° C. to about 100° C.

15. The process of claim 1 wherein the amount of azeotropic solvent is more than 3 to about 10 parts by weight per grafted polyolefin.

16. A process which comprises extracting a mixture comprising a grafted polyolefin and low molecular weight impurities with an azeotropic solvent, washing the extracted grafted polyolefin with additional azeotropic solvent, and drying the purified grafted polyolefin.

17. A process Which comprises (a) extracting a mixture comprising a maleic anhydride-grafted polypropylene or a maleic anhydride-grafted propylene copolymer and low molecular weight impurities with an azeotropic solvent comprising a hydrocarbon and an alkyl acetate; (b) drying the purified grafted polyolefin; and (c) distilling the used azeotropic solvent to recover a purified azeotropic solvent; wherein the azeotropic solvent is a liquid mixture of two or more substances that behaves like a single substance in that vapor produced by partial evaporation of the liquid mixture has the same composition as that of the liquid mixture.

18. The process of claim 17 wherein after step (a), the extracted mixture is washed with additional azeotropic solvent.

19. The process of claim 18 wherein step (a) is done by immersing the mixture in boiling azeotropic solvent, condensing the vapors that exit the top of the column, and pumping the condensed solvent back to the bottom of the column.

20. The process of claim 19 wherein an inert gas is fed from the bottom of the column in step (a).

* * * * *